United States Patent

[11] 3,611,312

[72] Inventors Robert S. Barton
Avelon;
Bobby A. Creech, Glendora; Benjamin A. Dent, Altadena; Erwin A. Hauck, Arcadia; William M. McKeeman, Palo Alto, all of Calif.

[21] Appl. No. 851,804
[22] Filed Aug. 21, 1969
[45] Patented Oct. 5, 1971
[73] Assignee Burroughs Corporation
Detroit, Mich.
Continuation-in-part of application Ser. No. 672,042, Oct. 2, 1967, now Patent No. 3,548,384.

[54] METHOD AND APPARATUS FOR ESTABLISHING STATES IN A DATA-PROCESSING SYSTEM
13 Claims, 1 Drawing Fig.

[52] U.S. Cl. 340/172.5
[51] Int. Cl. H04l 11/00, G06f 1/100
[50] Field of Search 340/172.5

[56] References Cited

UNITED STATES PATENTS

| | | | |
|---|---|---|---|
| 3,344,404 | 9/1967 | Curewitz | 340/172.5 |
| 3,440,612 | 4/1969 | Womack | 340/172.5 |

*Primary Examiner*—Raulfe B. Zache
*Attorney*—Christie, Parker & Hale

ABSTRACT: A data-processing system has a memory and a controllable operator control network operating in either of two different states for execution of operators and processing interrupts. A state control device is coupled to the controllable operator control network and has first and second states for causing the controllable operator control network to assume first and second states respectively. A first register stores operators for controlling the sequence of operation of the operator control network. A second register stores procedure reference words which have a coded signal therein indicative of either of two required states of the operator control network. The state control device is set to one state or the other depending on the coded signal in the stored reference word thereby establishing the state of the operator control network. A method for setting the state control device is also disclosed.

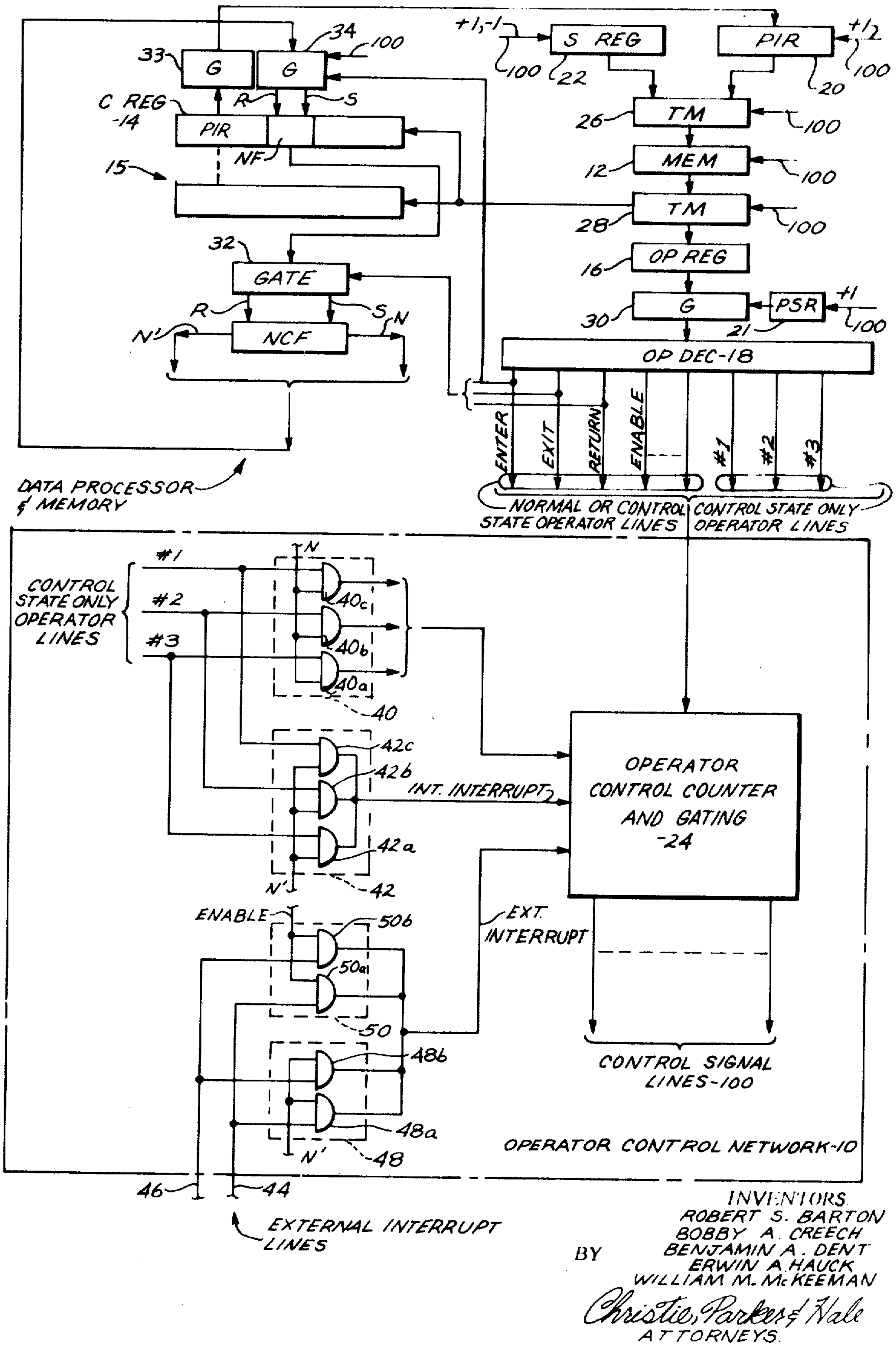
INVENTORS
ROBERT S. BARTON
BOBBY A. CREECH
BENJAMIN A. DENT
ERWIN A. HAUCK
WILLIAM M. McKEEMAN
BY Christie, Parker & Hale
ATTORNEYS.

METHOD AND APPARATUS FOR ESTABLISHING STATES IN A DATA-PROCESSING SYSTEM

CROSS-REFERENCE TO RELATED APPLICATION

The present application is a continuation-in-part to a copending patent application now U.S. Pat. No. 3,548,384 entitled Procedure Entry For A Data Processor Employing A Stack and assigned to the same assignee as the present application.

BACKGROUND OF THE INVENTION

Data processors are known having operator control networks which operate in one of two states for causing execution of operators by the system. These states are known as "normal state" and "control state." In normal state such operator control network is arranged to recognize all or most all interrupts, whereas no interrupts are recognized or handled in control state. Such data processors generally start running in control state. The transition from control state to normal state can only be accomplished by executing an operator designed for that specific purpose. The transition from normal state to control state is only accomplished by an interrupt condition. This interrupt can either be an unexpected one or one caused by the execution of an operator designed to cause the interrupt. An example of an unexpected interrupt would be completion of operation of some input-output device which needs immediate attention. Additionally, certain operators are only executed in control state and these operators cannot be executed in normal state.

Control state is an important part of modern data-processing machines as certain tasks require an uninterruptable condition as is provided through control state. Control state is used for handling functions which must be handled in coordination with other jobs coexisting in the same multiprocessing system. Examples of activities which must be coordinated are the initiation of the transfer of information between the processor or memory and an input-output device, allocating memory to a particular job and the assignment of peripheral devices to a particular job.

The way in which the aforementioned data processors change state create major difficulties. The first problem comes about due to the fact that if the system is operating in control state and a certain procedure (or series of operators) is to be executed in normal state a special operator is required to set the data processing system into normal state. A second problem arises in changing the machine from normal state to control state. As indicated above, it is accomplished by an interrupt condition. HOwever, to go from normal state to control state a general purpose interrupt handling routine is required. Such a routine is slow and requires memory space for the appropriate code.

SUMMARY OF THE INVENTION

The present invention revolves around the use of a signal in procedure reference words to change the state of the operator control network in a data-processing system from normal to control state and vice versa. Such an arrangement allows the aforementioned disadvantages to be greatly reduced and essentially eliminated. Briefly an embodiment of the present invention lies in a data processing system having a memory and a controllable operator control network operating in either of two different states for execution of operators and processing interrupts. A state control device is coupled to the controllable operator control network and has first and second states for causing the operator control network to assume first and second states, respectively. A first register stores operators for controlling the sequence of operation of the central control. A second register stores procedure reference signals which have a coded signal indicative of either of two required states of the central control. Means is provided for setting the state control device to one state or the other depending upon the coded signal in the stored procedure reference signal, thereby establishing the state of the operator control network.

The present invention also involves the method of setting the control state device responsive to a signal in an procedure reference signal.

BRIEF DESCRIPTION OF THE DRAWING

The FIGURE is a block and schematic diagram showing a data-processing system and embodying the present invention.

DESCRIPTION THE PREFERRED EMBODIMENT

Before describing the details of the data-processing system of the FIGURE consider the form of information representation used in the data-processing system. "Program" is used herein to identify one or more procedures. A "procedure" contains a number of different "operators" and the operators sequence the operation of the data-processing system.

Information is handled in the data-processing system in "-words." However, it should be understood that the invention is not restricted to a word-type machine but is applicable to other bit groupings such as digit groupings or individual bits. Although many different types of words are used in the actual data-processing system, for purposes of the present invention, reference only needs to be made to operand words, return control words, program control words and operator words.

The operand words are the actual data to be processed. The program control words and return control words and their content are of considerable importance to the present invention and should be carefully noted.

"Program control word" is a word that is used to enter a new or at least a different procedure. A program control word contains a number of different items of information for this purpose. However, only two items of information carried in the program control word are of importance to an understanding of the present invention. The first item of information is a PIR field which is an address in the memory which indirectly identifies a series of operators making up the new procedure corresponding to the program control word. The PIR field is an address of another address reference word which in turn has the address of the first operator in the new procedure. The second item of information of importance in a program control word is a single bit identified as the N-bit which identifies whether the new procedure is to be handled by the data-processing system in a "normal state" or in a "control" state. The N-bit is a "0" for normal state and a "1" for control state. Thus it should now be understood that a program control word is a procedure reference word which references the beginning of the new procedure and carries a bit which identifies the required state of the machine for the new procedure.

"Return control word" is used to identify a procedure to which the data-processing system is to return after having completed execution of a current procedure. Briefly, a return control word is formed whenever the processor executing one procedure is caused to enter a new or different procedure. The return control word is formed upon entering the new procedure and contains all of the information required to set up the machine to the state it left off with in the former procedure. LIke the program control word, the return control word contains a PIR field which is an address in memory which identifies the first operator of a series of operators to be executed in the former procedure. The return control word also contains an N-bit to identify whether the return procedure is to be handled by the system in "normal" state or "control" state. Return control words and program control words are both referred to as procedure reference words. They are similar in format and in information content.

The central control in data-processing system shown in the drawing operates in one of two states, namely control state, or normal state. The state in which the central control operates is controlled by the program control words and the return control words. "Control" state is a state wherein the operator control network causes execution of privileged instructions not available in normal state and these operators are known as "control state only operators." When in control state the operator control network will not cause execution of noncontrol state operators nor will it cause execution of external interrupts. An exception exists with respect to external interrupts as a special operator known as an "enable" operator can be used to override the control state and permit external interrupts. However, this is only caused by the special enable operator.

"Normal" state is a state of the operator control network wherein none of the "control state only" operators can be executed. However, other operators can be executed and external interrupts can be handled.

With the information representation generally in mind consider the details of the data-processing system shown in the drawing. An operator control network is shown generally at 10 and above 10 is generally shown a data processor and memory. The operator control network 10 contains an operator control counter and gating unit 24 which sequences the operation of the data-processing system shown in the drawing. Operator control networks as used herein include all of the gating logic, counters and control necessary to control the operation of the data-processing system. It will be evident to those skilled in the art that the control network can be distributed throughout the system rather than being combined into one unit.

Operator control counters and gating structures for sequencing data processors and memories during execution of operators are well known in the computer art and may be of many different types depending on the design of the particular data-processing system. Therefore, the exact details of the operator control counter and gating unit 24 need not be explained for a complete understanding of the present invention. The operator control counter and gating unit 24 has control signal lines shown generally at 100 at which control signals are applied in the proper sequence to control the operation of the data processor and memory. The lines 100 are shown going into various circuits in the drawing for control purposes. All are identified by the general symbol 100, for simplicity. However, it will be understood that the lines in most cases are different and control signals may be applied on the various lines at different points in time depending on the sequence of operation of the control counter and gating unit 24.

The data-processing system includes a memory 12. The memory 12 may be a magnetic core memory or any one of a number of other types of memories well known in the computer art. Memory 12 is arranged for reading out and writing information a word at a time in response to control signals on the control signal lines 100 from the central control 10. The words read out from the memory 12 are stored in either an operator register 16 or a C register 14 or other registers shown generally at 15. Information may be stored in the memory 12 from C register 14 or one of the other registers 15. The address in the memory 12 at which information is read or written is determined by an address contained in either a PIR register 20 or an S register 22.

In the actual embodiment of the present invention stacks are provided for storing operands and various types of reference words. A stack is an area of memory in which words of information are stored on a last in first out basis. When a particular program stack is activated that C register 14 and registers 15 are linked to the stack of information in the memory. This linkage is established by the address contained in the S register 22 which points to the last (or top) word stored in the stack area in memory. Actually many stacks exist in the memory 12. Any one of the stacks may be linked up to the registers 14 and 15 at any one time. The registers 14 and 15 are in effect the top of stack registers for the linked stack and extend the stack to enable quick access to the information stored in these registers. Details of such a stack and the register linkages are described in the copending patent application entitled "Procedural Entry For A Data Processor Employing A Stack."

In operation the control counter and gating unit 24 of central control 100 applies a control signal on one of the control lines 100 to the transfer matrix 26 causing the address contained in the S-register 22 to be applied to the memory 12. Actually the transfer matrix has several lines 100 connected thereto, only one being shown for illustration. The unit 24 also applies a signal on one of the control signal lines 100 to the memory 12, causing the content of the addressed memory location to be read out and applied to a transfer matrix 28. Assume that the word read out from the memory 12 is either a return control word or a program control word. The transfer matrix 28 is actually connected to a number of lines 100 and, for a program control word or return control word, an appropriate control signal is applied on one of the control signal lines 100 causing the transfer matrix 28 to store such word into the C-register 14. The program control word or return control word is stored into the C register 14 within the PIR address in the field of the C-register 14 identified by PIR and the N-bit in a NF flip-flop.

After the address in the S-register 22 is used to address the memory 12 the unit 24 applies a control signal on one of the lines 100 causing gating (not shown) in the S-register 22 to count the address therein down one state so that it contains the address of the next word in the corresponding stack.

Consider now the PIR register 20 and the way in which operators are stored in the operator register 16. An individual operators word contains a plurality of operators. The PIR register 20 points to or contains the address in memory of an operator word.

In operation the unit 24 applies a control signal on one of the control signal lines 100 to the transfer matrix 26 causing the state of the PIR register 20 to be applied to the memory 12. The memory 12 reads out the operator word from the corresponding address and applies the operator word to the transfer matrix 28. The unit 24 also applies a control signal on one of the control signal lines 100 to the transfer matrix 28 causing the operator word to be stored in the operator register 16.

Since only one operator of the operator word stored in the operator register 16 is to be executed at one time, a gating circuit 30 is provided for gating only one operator to an operator decoder 18. The particular operator gated out from the operator register 16 is determined by a PSR counter 21. The PSR counter 21 has a state for each operator stored in the operator register 16 which is to be applied to the operator decoder 18. The gating circuit 30 is responsive to each state of the PSR counter 21 for gating the corresponding operator to the operator decoder 18.

The operator decoder 18 has an operator output line (i.e. enter, exit - - -) for each different operator to be executed. A control signal is applied on the operator output line corresponding to each operator applied thereto by the gate 30. The control counter and gating unit 24 is coupled to all of the operator lines and goes through a sequence of steps corresponding to the operator line energized. The sequence of steps of the unit 24 cause the proper sequence of control signals on lines 100 to cause the particular operator to be executed by the data processor and memory.

It will be understood that all of the circuits for execution of a complete set of operators is not shown in the drawing but such circuitry is well known and need not be described in detail for a complete understanding of the present invention. After the control counter and gating unit 24 has applied the control signals at the control signal lines 100 required to execute an operator a control signal is applied on a control signal line 100 to the PSR counter 21 causing gating therein (not shown) to count it to the next state corresponding to the next operator in the register 16 to be executed. When the PSR counter 21 reaches its last state it recycles and starts counting through the states over again in response to control signals from unit 24. As the PSR counter is recycled the unit 100 applies a control signal to the PIR register 20 causing gating (not shown) to count the address in the PIR register 20 up one state. The unit 100 also causes the new address in PIR to be applied to the memory 12 and the operator word in such address is read out and stored in the operator register 16 as described above.

The state of the central control 10 i.e. "normal" or control state is determined by a flip-flop identified by the symbol NCF. A path from the C-register 14 to the NCF flip-flop and a path from the NCF flip-flop back to the C-register 14 are of considerable importance and should be noted carefully in connection with the present invention. The path between the C-register 14 and the NCF flip-flop is provided by a gate 32. The gate 32 sets the NCF flip-flop to a state corresponding to the state of the NF flip-flop in the C-register 14. The state of the NF flip-flop is determined by a program control word or a return control word stored in the C-register 14. The gate 32 is also controllable by certain operator lines (enter, exit and return) from the operator decoder 18.

A gate 34 is coupled between the output circuits of the NCF flip-flop and the input circuits of the NF flip-flop in the C-register 14. The gate 34 is controlled by the enter operator line from the operator decoder 18 for setting the NF flip-flop to a state corresponding to the state of the NCF flip-flop. The NF flip-flop is set corresponding to the state of the NCF flip-flop when a return control words is being formed in register 14.

Thus it is important to note that the state of the NCF flip-flop which controls the state of the operator control networks is saved in the N-bit of the return control word formed in the C-register 14 when a new procedure is entered.

Consider now the various type of operators which can be executed in either normal or control state. By way of example four different operators are given herein. However, other operators may be included. The four operators are: "enter" operator, "exit" operator, "return" operator and "enable" operator.

In operation, an enter operator causes the data processor to enter a new procedure. Whenever an enter operator is to be executed control counter and gating unit 24 first generate signals at 100 causing a program control word to be stored into the C-register 14, thereby setting the NF flip-flop with the N-bit of the program control word. When the gate 30 applies the enter operator to the operator decoder 18 a signal is applied on the enter operator line at the output of the decoder 18. The signal on the enter operator line causes the gate 32 to set the NCF flip-flop to a state corresponding to the state of the NF flip-flop in register 14. It may now be seen that the state of the NCF flip-flop may be determined by the N-bit of a program control word stored into the C-register 14.

A program control word is used to enter a new procedure, or start executing a different series of operators for a different 20 Accordingly, it is necessary to set the PIR register 20 to the address corresponding to the first operator word of the new procedure. By way of example a gate 33 is provided and a control signal on one of the control signal lines 100 from the central control 10 causes the address contained in the PIR field of the C-register 14 to be stored into the PIR register 20 by gate 33. Thus the next operator (of the new procedure) readout under control of the PIR register 20 is determined by the PIR address field of a program control word. It will be understood that the invention is not limited to an organization wherein the PIR address is placed directly into the PIR register 20 but the PIR field of the program control word may be an indirect address which is used to form the address of another word in memory which in turn may contain the address to be placed in the PIR register 20. Such indirect reference words and the method for handling them are disclosed in the above-identified patent application entitled "Procedure Entry For A Data Processor Employing A Stack."

An enter operator also causes a return control word to be formed in register 14. One of the items of information placed in a return control word is the state of the central control for the procedure being executed at the time that the return control word is formed. Gate 34 is responsive to an enter operator and a control signal on one of the control signal lines 100 from the central control 10 for setting the NF flip-flop in register 14 to a state corresponding to the state of the NCF flip-flop. In this manner the state of the machine is preserved in the N-bit of the return control word being formed in the C-register 14. The rest of the steps for generating a complete return control word in the C-register 14 is not explained herein as they are not essential for a complete understanding of the present invention. However, a complete description of the way in which the return control word is formed is described in the above-referenced patent application entitled "Entry For A Data Processor Employing A Stack."

An exit operator is one which causes a different procedure to be entered. Again, whenever an exit operator is executed, a return control word is first stored in the C-register 14. Similar to an enter operator the gate 32 is responsive to a signal on the exit line from the operator decoder 18 for setting the NCF flip-flop to the state of the NF flip-flop in the C-register 14 which is set by the return control word.

A return operator causes a control signal on the return operator line from the operator decoder 18. The return operator is similar to the exit operator in that the return control word is always stored in the C-register 14 prior to execution of the return operator and a control signal on the return operator line from the operator decoder 18 causes the gate 32 to set the NCF flip-flop to a state corresponding to that of the NF flip-flop in the C-register 14.

Consider now the details of the operator control network 10 which responds to the NCF flip-flop. An enable control circuit 40 is provided which enables the control counter portion of the control counter and gating unit 24 to continue the sequence of operation for execution of one of the "control state only" operators. This can obviously be handled as an input to a control gate for the control counter. Examples of control state only operators are set "interval timer," "set interrupt mask" and "initiate input-output."

The set interval timer operator causes an interval timer (not shown) to be set by the control counter and gating unit 24 by a control signal on one of the control signal lines 100. The set interrupt mask operator causes the control signal lines 100 causing a mask register (not shown) to be set for a mask operation. The initiate input-output operator causes the control counter and gating unit 24 to apply a signal on one of the control signal lines 100 causing communication to be established between an input-output unit (not shown) and the data processor shown in the drawing. The setting and use of interval timers, the setting and use of mask registers and the initiation and communication of data processors with input-output units are well known in the computer art and need not be described in detail herein for a complete understanding of the present invention.

For purposes of explanation the output lines from the operator decoder 18 which correspond to the control state only operators are referenced by the symbols 01, 02 and 03. The enable control circuit 40 has three AND gates referenced by the symbols 40*a*, 40*b* and 40*c* which are connected to the control state only operator lines 03, 02 and 01 respectively. An input of each of the AND gates 40*a*, 40*b* and 40*c* is connected to the N-output of the NCF flip-flop. The N-output receives a control signal whenever the NCF flip-flop is in a one state corresponding to a control state. Thus the enable control circuit 40 applies a control signal at the output of one of the AND gates 40*a*, 40*b* and 40*c* when the NCF flip-flop is in a 1-state indicating a control state. The corresponding control state only operator line is activated.

The outputs of the AND gates 40*a*, 40*b* and 40*c* are individually connected to the control counter and gating unit 24. The signal at the output of one of the AND gates 40*a*, 40*b* and 40*c* causes the control counter portion of the operator control counter and gating unit 24 to continue with the execution of the corresponding control state operator.

An internal interrupt circuit 42 is provided for interrupting the normal operation of the control counter and gating unit 24, for an error condition. This error condition exists whenever a control state only operator is being executed but the NCF flip-flop is in a 0-state indicating a normal state of the machine. The internal interrupt circuit has a single output connected to the internal interrupt to the unit 24. The signal from the internal interrupt circuit 42 causes the operator control counter and gating unit 24 to alter its normal operation for execution of control state operators and branch to a mode wherein the error condition is automatically handled by the data processor. Interrupts and methods whereby central control units handle interrupts in data processors are well known in the computer art and there are many ways in which such interrupts can be handled. Therefore, description thereof is not given herein as it is not essential to a complete understanding of the present invention.

Returning to the internal interrupt circuit 42, three AND gates 42*a*, 42*b* 42*c* are provided. Each has an input from the N' output of the NCF flip-flop, which receives a control signal when the NCF flip-flop is in a 0-state indicating a "normal" state of the machine. The inputs to the AND gates 42*a*, 42*b* and 42*c* are connected to the control state only operator lines 03, 02 and 01, respectively. The outputs of the AND gates are connected together to the internal interrupt line. Thus, when the NCF flip-flop is in 0-state O-state indicating a normal state and a control signal is formed on any one of the control state only lines the AND gate receiving the control signal, from a control state only line, applies an output to the internal interrupt line to the control counter and gating unit 24.

Thus, the enable control circuit 40 and the internal interrupt circuit 42 provide a means for controlling the sequence of operation of the control counter portion of the operator control counter and gating unit 24 allowing the normal operation thereof to continue thereby executing a control state operator only when the NCF flip-flop is a 1-state indicating a control state. If a control state only operator is being executed and the NCF flip-flop is in a 0-state indicating a normal state for the machine an interrupt occurs stopping the execution of the control state operator.

An external interrupt circuit 48 is provided for causing the operator control counter and gating unit 24 to interrupt the execution of any operator when the NCF flip-flop is in a 0-state indicating a normal state. In other words, when an external interrupt is received and a normal state exists (NCF in a O-state) the operator being executed is interrupted and the operator control counter and gating unit 24 causes the external interrupt to be handled. An example of a condition requiring an external interrupt is: A multiplexer, a card reader or a magnetic tape transport which is ready to communicate with the data processor. External interrupts and method and apparatus are well known in the computer art and need not be described in detail for a complete understanding of the present invention. However, in brief, the operator control counter and gating unit 24 applies a sequence of control signals at the lines 100 to cause the external interrupt to be carried out. External interrupt signal lines 44 and 46 are shown by way of example and one of these lines receives a control signal whenever an external interrupt is requested. The external interrupt circuit 48 has AND gates 48*a* and 48*b* connected to the external interrupt lines 44 and 46. The AND gates 48*a* and 48*b* also have an input connected to the N' output of the NCF flip-flop. The outputs of the AND gates 48*a* and 48*b* are connected together to an external interrupt input to the operator control counter and gating unit 24. Thus, whenever a signal is applied on one of the external interrupt lines 44 and 46 and the NCF flip-flop is in a 0-state, causing a control signal at the N' output, (normal state) the AND gates 48*a* or 48*b* corresponding to the lines 44 and 46, receiving the control signal, applies a control signal to the external interrupt input to the operator control counter and gating unit 24. If for some reason a control state exists (a 0-state of the NCF flip-flop) when an external interrupt signal is received the external interrupt circuit 48 will block the signal and will prevent the operator control counter and gating unit 24 from handling the external interrupt condition.

An override circuit 50 is provided for overriding the external interrupt circuit 48 in response to an enable operator. The override circuit 50 has AND gates 50*a* and 50*b* connected to the external interrupt lines 44 and 46. The AND gates 50*a* and 50*b* also have an input connected to the enable operator line. Whenever a control signal is applied on the enable operator line simultaneously with the application of a control signal on one of the external interrupt lines 44 and 46 the corresponding AND gate, 50*a* or 50*b* applies a control signal to the external interrupt input to the control counter and gating unit 24 causing it to handle the interrupt as exampled hereinabove.

It should now be understood that a data processor is disclosed having a memory and a controllable operator control network 10 which operates in either of two different states for execution of operators and for the processing of interrupts. The NCF flip-flop is a state control device which is connected to the controllable operator control network 10 and has first and second states for causing the operator control network 10 to assume first and second states. A register 14 is provided for storing procedure reference words which have a coded signal indicative of either of the two states required of the operator control network. Means including a gate 32 is provided for setting the state control flip-flop NCF to one state or the other depending on the coded signal in the stored procedure reference word. As a result the state of the operator control network is established.

What is claimed is:

1. In a programmable data-processing system having a controllable operator control network in one of a plurality of states for execution of operators and processing of interrupts the combination comprising, state control means coupled for controlling the state of such operator control network, register means for storing procedure reference words which have a coded signal therein indicative of a required state of the controllable operator control network, and means for setting said state control means to a state corresponding to the coded signal in the stored procedure reference word thereby establishing the state of the operator control network.

2. In a programmable data-processing system having a memory and a controllable operator control network operating in one of a plurality of states for execution of operators and processing of interrupts the combination comprising, state control means coupled to the controllable operator control network and having a plurality of states for causing the controllable operator control network to assume a corresponding plurality of states, first register means for storing operators for controlling the sequence of operation of the controllable operator control network, second register means for storing procedure reference words which have a coded signal therein indicative of a required state of the controllable operator control network and means for setting said state control means to a state corresponding to the coded signal in the stored procedure reference word thereby establishing the state of the controllable operator control network.

3. In a programmable data-processing system having a memory and a controllable operator control network operating in either of two different states for execution of operators and processing of interrupts the combination comprising state control means coupled to the controllable operator control network and having first and second state for causing the controllable operator control network to assume first and second states respectively, first register means for storing operators for controlling the sequence of operation of the operator control networks, second register means for storing procedure reference words which have a coded signal therein indicative of either of two required states of the controllable operator control network and means for setting said state control means to one state or the other depending on the coded signal in the stored procedure reference word thereby establishing the state of the operator control network.

4. In a programmable data-processing system according to claim 3 wherein a return control word may be formed in said second register means for use in returning the system to a procedure, and including means for storing a signal corresponding to the state of said state control means into a return control word being formed in said second register means.

5. In a programmable data-processing system the combination comprising a. memory means for storing operators for execution and procedure reference words, said procedure reference words comprising a binary bit indicative of a required state of the data processor, b. first register means for storing procedure reference words from said memory means, c. second register means for storing operators from said memory means for execution, d. bistable means having first and second states indicative of first and second states, e. means for setting said bistable means to a state corresponding to said binary bit contained in a procedure reference word in said first register means, and f. operator control means for the data processor for generating control signals responsive to operators in said second register means and additionally being operable in a first or a second state responsive to a first or a second state respectively, of said bistable means.

6. In a programmable data-processing system according to claim 5 wherein said operators include predetermined operators for control of changing procedures under execution, said means for setting being responsive to at least one of said predetermined operators for setting said bistable means to a state corresponding to said binary bit in a procedure reference word.

7. In a programmable data-processing system according to claim 5 wherein said operators include an operator for control of entry into a different procedure, a return control word, for the current procedure, being formed in said first register means, and means for setting a particular cell in said first register means to a state corresponding to the state of said bistable means in response to such operator in said second register means and thereby complete a portion of such return control word.

8. In a programmable data-processing system according to claim 5 wherein the advancement of operation of said operator control means for certain operators is dependent on an enable signal, and comprising gating means responsive to such certain operators and to a predetermined state of said bistable means for applying an enabling signal to said operator control means for enabling continued execution of such certain operators.

9. In a programmable data-processing system according to claim 5 wherein the advancement of operation of said operator control means may be altered to a different sequence for certain operators by an interrupt signal and gating means responsive to a predetermined state of said bistable means and one of such certain operators for applying an interrupt signal to said operator control means.

10. In a programmable data-processing system according to claim 5 wherein the advancement of operation of said operator control means may be altered to a different sequence for certain operators responsive to an interrupt signal, means for receiving external interrupt signals, gating means responsive to an external interrupt signal for applying said interrupt signal to said operator control means and responsive to a predetermined state of said bistable means for preventing application of said interrupt signal to said operator control means.

11. In a programmable data-processing system according to claim 10 including override circuit means responsive to the combination of an enable operator and or external interrupt signal for applying an interrupt signal to said operator control means and thereby cause said operator control means to cause processing of an external interrupt independent of the state of said bistable means.

12. A method for establishing one of a plurality of states of an operator control means in a programmable data-processing system having a memory with operator signals and procedure reference signals stored therein and a state control device for the central control, the steps comprising reading out procedure reference signals and operator signals from the memory, responding to a predetermined signal in the procedure reference signals indicative of a required state for setting the state control device to a state corresponding to the value of the predetermined signal thereby establishing the state of the operator control means.

13. A method according to claim 12 wherein the operator signals include a predetermined operator signal for changing the series of operator signals being executed by the data-processing system, the step of responding including the step of responding to both a predetermined operator signal and the predetermined signal in the procedure reference word for setting the state control device.

PO-1050
(5/69)

UNITED STATES PATENT OFFICE
CERTIFICATE OF CORRECTION

Patent No. 3,611,312 Dated October 5, 1971

Inventor(s) Robert S. Barton, Bobby A. Creech, Benjamin A. Dent, Erwin A. Hauck and William M. McKeeman It is certified that error appears in the above-identified patent and that said Letters Patent are hereby corrected as shown below:

Col. 1, line 49, "HOwever" should read --However--;

Col. 2, line 10, after "DESCRIPTION" insert --OF THE--;

Col. 4, line 15, "within" should read --with--;

Col. 5, line 23, "words" should read --word--;

Col. 6, line 8, before "Entry" insert --Procedure--;
line 38, after "causes" insert --the operator control counter and gating unit 24 to apply a control signal on one of--;
line 52, "01, 02 and 03" should read --#1, #2 and #3--;
line 55, "03, 02 and 01" should read --#3, #2 and #1--;

Col. 5, line 49, delete "20" and insert --procedure--;
line 55, "readout" should be --read out--;

Col. 7, line 19, "03, 02 and 01" should read --#3, #2 and #1--;
line 21, delete "0-state", first occurrence, and insert --an--;

Col. 10, line 1, delete "for".

Signed and sealed this 13th day of June 1972.

(SEAL)
Attest:

EDWARD M.FLETCHER,JR.
Attesting Officer

ROBERT GOTTSCHALK
Commissioner of Patents

PO-1050
(5/69)

UNITED STATES PATENT OFFICE
CERTIFICATE OF CORRECTION

Patent No. 3,611,312 Dated October 5, 1971

Inventor(s) Robert S. Barton, Bobby A. Creech, Benjamin A. Dent, Erwin A. Hauck and William M. McKeeman It is certified that error appears in the above-identified patent and that said Letters Patent are hereby corrected as shown below:

Col. 4, lines 71 and 74, "100" should read --24--.

Signed and sealed this 10th day of October 1972.

(SEAL)
Attest:

EDWARD M.FLETCHER,JR.
Attesting Officer

ROBERT GOTTSCHALK
Commissioner of Parents